United States Patent
Ehrmann

(10) Patent No.: US 8,790,555 B2
(45) Date of Patent: Jul. 29, 2014

(54) TOOL CHANGING DEVICE

(75) Inventor: Elmar Ehrmann, Bad Grönenbach (DE)

(73) Assignee: Multivac Sepp Haggenmueller GmbH & Co. KG, Wolfertschwenden (DE)

(*) Notice: Subject to any disclaimer, the term of this patent is extended or adjusted under 35 U.S.C. 154(b) by 230 days.

(21) Appl. No.: 13/466,214

(22) Filed: May 8, 2012

(65) Prior Publication Data

US 2012/0289387 A1 Nov. 15, 2012

(30) Foreign Application Priority Data

May 10, 2011 (EP) .................................... 11003824

(51) Int. Cl.
*B29C 31/00* (2006.01)
*B29C 51/18* (2006.01)
*B29C 51/20* (2006.01)
*B29C 51/26* (2006.01)

(52) U.S. Cl.
USPC ........... 264/46.8; 264/166; 264/280; 264/293; 425/505; 425/184; 425/193; 425/353; 425/403.1

(58) Field of Classification Search
CPC ........ B29C 31/00; B29C 51/18; B29C 51/20; B29C 51/261; B29C 51/266
USPC ..................... 264/46.8, 284, 293, 297.7, 555; 425/505, 520, 182, 184–186, 193, 425/352–353, 394, 403, 403.1, 412–413
See application file for complete search history.

(56) References Cited

U.S. PATENT DOCUMENTS

| | | | | |
|---|---|---|---|---|
| 5,619,913 A | * | 4/1997 | Padovani | 425/193 |
| 6,024,820 A | * | 2/2000 | Ozawa et al. | 425/383 |
| 7,204,793 B2 | * | 4/2007 | Hedin | 100/224 |
| 7,361,008 B2 | * | 4/2008 | Crepaz | 425/403 |
| 7,815,428 B2 | * | 10/2010 | Minghetti | 425/184 |

FOREIGN PATENT DOCUMENTS

| | | |
|---|---|---|
| CN | 1097160 A | 1/1995 |
| CN | 1157209 A | 8/1997 |
| CN | 101232989 A | 7/2008 |
| CN | 101648420 A | 2/2010 |
| DE | 19738954 A1 | 3/1999 |
| EP | 0467069 A1 | 1/1992 |
| EP | 1234765 A1 | 8/2002 |
| EP | 1520682 A1 | 4/2005 |

* cited by examiner

*Primary Examiner* — Joseph S Del Sole
*Assistant Examiner* — Thukhanh Nguyen
(74) *Attorney, Agent, or Firm* — Husch Blackwell LLP

(57) ABSTRACT

The invention relates to a tool changing device of a work station in a thermoform packaging machine, used for allowing a work insert to be pushed out of the work station laterally relative to the production direction, a chain guide be movable vertically to the tool insert.

18 Claims, 4 Drawing Sheets

TOOL CHANGING DEVICE

CROSS-REFERENCE TO RELATED APPLICATION

This Application claims priority to European Application Number 11003824.7 filed May 10, 2011 to Elmar Ehrmann entitled "Tool Changing Device," currently pending, the entire disclosure of which is incorporated herein by reference.

TECHNICAL FIELD

The invention relates to a tool changing device of a thermoform packaging machine according to the preamble of claim 1 and a method according to claim 8 for changing a tool insert.

BACKGROUND

EP 1 234 765 B1 discloses a tool changing system in which tool components are automatically transferred in the production direction via a transfer area to a parking position without any necessity of removing the film web in this area. In this system, all the tools remain in or on the machine. The tools at the parking position and the transfer area lead to high space requirements. The space requirements also limit the number of tools that can be kept at the parking position.

EP 0 467 069 A1 discloses a thermoform packaging machine in which a forming tool lower part can be withdrawn laterally from the thermoform packaging machine. This is done without influencing the film web.

SUMMARY OF THE INVENTION

For exchanging tool upper parts in a thermoform packaging machine, said tool upper parts are normally raised and exchanged. Tool inserts which are to be exchanged in tool upper parts, e.g. on forming or sealing stations, and part of which is located between the transport chains and the chain guides, respectively, are raised as a unit with the tool upper part or are removed from the tool upper parts in the direction of production above the film web and exchanged.

It is the object of the present invention to provide a possibility of laterally exchanging a tool insert of a tool upper part in a thermoform packaging machine.

This object is achieved by a tool changing device having the features according to claim 1 and by a method according to claim 8. Advantageous further developments of the invention are disclosed in the subclaims.

The tool changing device according to the present invention used for a tool insert of a work station of a thermoform packaging machine, which provides a chain guide on either side of a web-shaped material for conveying said web-shaped material through the work station, is characterized by a chain guide which is vertically movable relative to the tool insert so that the tool insert can be displaced laterally relative to the production direction. For tool inserts that are provided above the film web, the chain guide is lowered to such an extent that it does not represent a contour interfering with a movement of the tool insert across the chain guide. In the case of tool inserts located below the film web, the chain guide is raised to such an extent that the chain guide will not interfere with the movement of the tool insert in this case, either. For carrying out the exchange function, it will suffice when the movability of the chain guide is provided in the area required for the tool insert.

Preferably, the chain guide is movable relative to the tool insert to a changing position and to a working position, the changing position being a position which is lowered or raised relative to the film web that is to be conveyed along the thermoform packaging machine. The chain guide occupies the working position for conveying the film web, said film web being positioned in the area of the forming station on the same level as in the areas of the infeed line, the sealing station and the cutting station along the production direction.

It is particularly advantageous when the movement of the chain guide is coupled to a tool upper part or a tool lower part. Additional drive systems can thus be dispensed with and a simple and economy-priced structural design is made possible.

In the case of a chain guide which is driven separately from a tool lower part or a tool upper part of the work station, this chain guide is preferably movable by means of at least one actuator, e.g. a pneumatic cylinder or a servo motor, so as to be movable independently of other movements of a work station, which may also take place in parallel. When tools are being exchanged above and below the film web within a work station, it is thus possible to move the tools to the respective most advantageous changing position.

Preferably, the tool insert is a heating plate, when the work station is a forming station, or the tool insert is a sealing plate, when the work station is a sealing station. A tool carrier accommodating the tool insert can thus be fixedly mounted on the machine frame and the e.g. format-dependent tool insert can be removed laterally from the thermoform packaging machine, easily and in an ergonomically adapted manner, for the purpose of exchange or cleaning.

Preferably, the tool insert is in contact with the tool carrier and a cooling plate of the forming station, respectively, when the forming station is in operation, so as to permanently cool a tool insert implemented as a heating plate. The cooling circuit is provided in the tool carrier of the forming station, which tool carrier is fixedly attached to the machine frame, and a discharge of the cooling water prior to the removal of the tool insert can be dispensed with, whereby the tool changing time will be reduced.

Preferably, a thermoform packaging machine is provided with a tool changing device according to the present invention, so that a tool insert can be exchanged more easily and the time required for this exchange can be reduced.

The method according to the present invention, which is used for operating a tool changing device of a work station in a thermoform packaging machine, provides a chain guide for conveying a web-shaped material through the work station, and the chain guide is, at least in the area of the work station, moved vertically relative to a tool insert to a changing position so as to laterally displace the tool insert relative to the production direction for the purpose of changing. This allows a simple and rapid exchange of the tool insert by removing it laterally from the thermoform packaging machine, without any necessity of removing the film web in the area of the work station and without any necessity of carrying out mechanical modifications.

Preferably, the movement of the chain guide to the changing position takes place simultaneously with or after the opening of the respective work station, and, during opening of the work station, a tool which is which is positioned on the side of the web-shaped material facing away from a product is moved relative to and away from the tool insert, which is positioned on the side of the web-shaped material facing the product.

Preferably, the movement of the chain guide to the working position takes place before or simultaneously with the closing of the respective work station, and, during closing of the work station, a tool which is positioned on the side of the web-shaped material facing away from a product is moved relative to and towards the tool insert, which is positioned on the side of the web-shaped material facing the product.

According to a particularly advantageous embodiment, the chain guide is moved by a tool upper part or a tool lower part of the respective work station. An additional drive for this movement is therefore not required.

Alternatively, the movement of the chain guide is executed by means of an actuator, preferably a pneumatic cylinder or a servo motor.

The movement of the chain guide preferably takes place while the web-shaped material is standing still, so as to avoid special loads on the chain guide and the web-shaped material.

Preferably, the work station is a forming station or a sealing station, which include tool inserts such as a heating plate or a sealing plate.

According to a preferred embodiment, the tool insert is cooled indirectly by means of a cooling plate of the forming station by bringing the tool insert and the cooling plate of the forming station into large-area contact with one another and by providing active cooling by means of a cooling circuit only in the non-movable cooling plate. It is neither necessary to separate the tool insert from the cooling water supply and cooling water drain nor is it necessary to discharge water from the interior of the tool insert. Tool changing is simplified still further in this way.

According to an expedient embodiment, power lines, e.g. for current, pressurized air or a vacuum, are provided with plug connections between the tool insert and the tool carrier, said plug connections being automatically disconnected when the tool insert is being pulled out, and automatically connected when the tool insert is being pushed in. Manual operations for disconnecting or unplugging the individual line connections are therefore not necessary and the tool changing time is reduced.

Preferably, the tool insert is automatically unlocked by means of a control for removal from the work station and/or automatically locked after insertion in the work station. The exact and repeatable position of the tool insert in the work station is thus guaranteed, and, in combination with an optional sensor system, machine start can be allowed or inhibited in an adequate manner.

BRIEF DESCRIPTION OF THE DRAWINGS

In the following, an advantageous embodiment of the invention will be explained in more detail by making reference to a drawing, in which the individual figures show.

Identical components are designated by identical reference numerals throughout the figures.

DETAILED DESCRIPTION OF THE INVENTION

Figure 1:
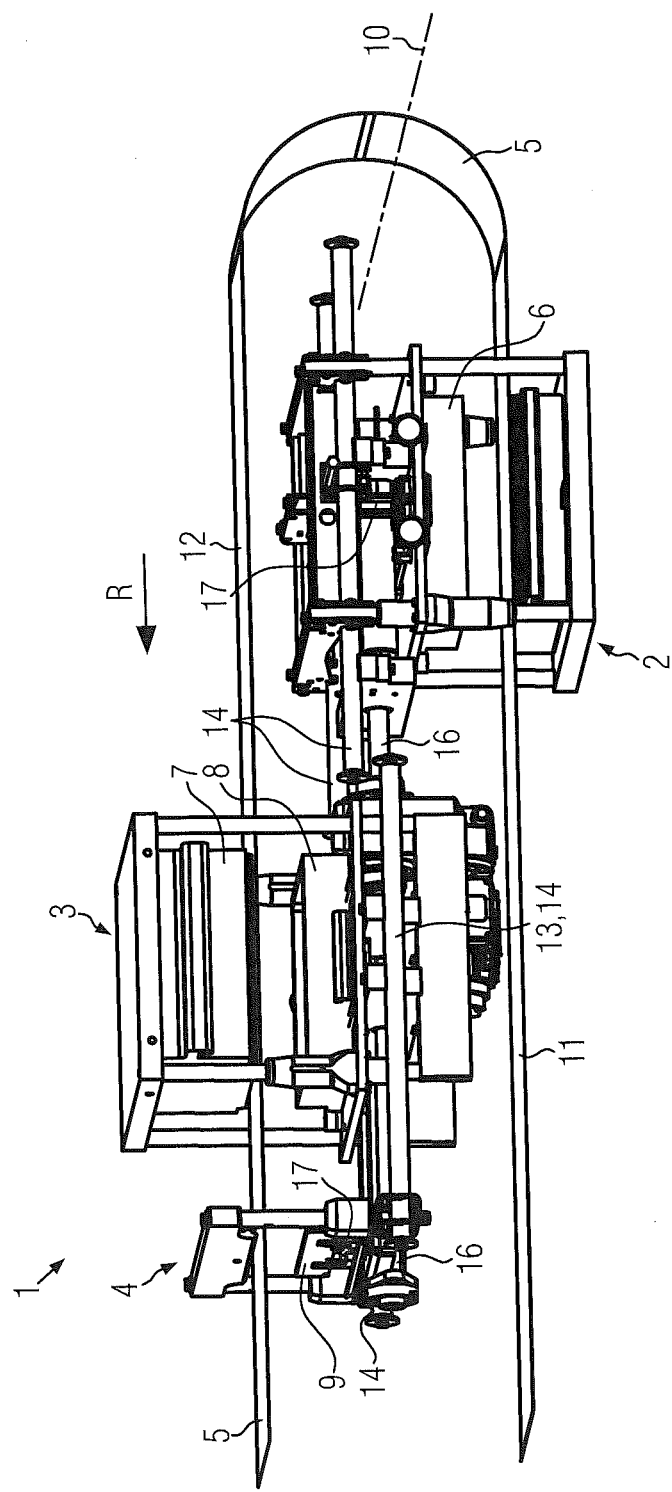
FIG. 1 a perspective view of a thermoform packaging machine with open work stations, FIG. 2 a sectional view through the forming station in the production direction with a tool changing device according to the present invention at a closed position, FIG. 3 a sectional view through the forming station in the production direction at an open position and in the raised condition of the chain guide, FIG. 4 like FIG. 3, with tool insert moved out to the side.

FIG. 1 shows an embodiment of a thermoform packaging machine 1 in a perspective view.

The thermoform packaging machine 1 comprises (at least) three work stations, viz. a forming station 2, an evacuating and sealing station 3 and a separating station 4. All these work stations 2, 3, 4 act on a web-shaped material 5, said material 5 being a web of plastic film/foil. To this end, the forming station 2 is provided with a forming tool 6. When the web-shaped material 5 is at a standstill during the intermittent operation of the thermoform packaging machine 1, the forming tool 6 is moved perpendicularly to the plane of the web-shaped material 5 so as to thermoform packaging troughs in the web-shaped material 5.

The sealing station 3 comprises a sealing tool upper part 7 and a sealing tool lower part 8. By moving the sealing tool upper part 7 and/or the sealing tool lower part 8 in a direction towards one another, a closed sealing chamber can be formed between the two tool members 7, 8. In said sealing chamber, the packaging trough, which has been formed in the web-shaped material 5 and filled with a product before, can be sealed with a top foil, which is not shown, and closed in this way. It is imaginable to evacuate the sealing chamber between the two tool members 7, 8 and, consequently, the packaging trough prior to sealing and/or to flush them with a replacement gas. After the sealing step, the sealing tool upper part 7 and the sealing tool lower part 8 are moved apart so as to release the packaging trough and allow further transport of the web-shaped material 5.

The separating station 4 is, in the present embodiment, a cross separator in which a separating knife 9 is provided as a tool member. This separating knife 9 can be moved vertically, i.e. perpendicularly to the plane of the web-shaped material 5, so as to cut through the web-shaped material 5.

The thermoform packaging machine 1 defines a production direction R in which the web-shaped material 5 is conveyed through at least some of the work stations, in the present embodiment through the sealing station 3 and the separating station 4. In the forming station 2, the web-shaped material 5 is conveyed in a direction opposite to this production direction R before it is deflected about a virtual, horizontal axis 10 and thus transferred from a first conveying plane 11 to a second conveying plane 12.

The thermoform packaging machine 1 is provided with a frame 13, which is arranged horizontally between the two conveying planes 11, 12. The frame 13 comprises a plurality of lateral longitudinal bars 14, which are oriented in the production direction R of the packaging machine 1, as well as a plurality of cross bars 15 interconnecting said longitudinal bars 14. At each work station 2, 3, 4 of the packaging machine 1, the frame 13 is provided with two longitudinal bars 14, which are oriented parallel to one another and which extend on the same level. These longitudinal bars 14 extend at least over the length of a work station 2, 3, 4 in the production direction R.

A shaft 16, which is also oriented in the production direction R of the thermoform packaging machine 1, extends centrally between the longitudinal bars 14. The shaft 16 is connected to a drive, e.g. an electric motor, preferably a servomotor. In the present embodiment, the shaft 16 can be driven alternately in different directions of rotation by means of the drive.

FIG. 1 shows the packaging machine in a condition in which the tools 6, 7, 8, 9 of the respective work stations 2, 3, 4 are open so as to allow further transport of the web-shaped material 5.

Figure 2:
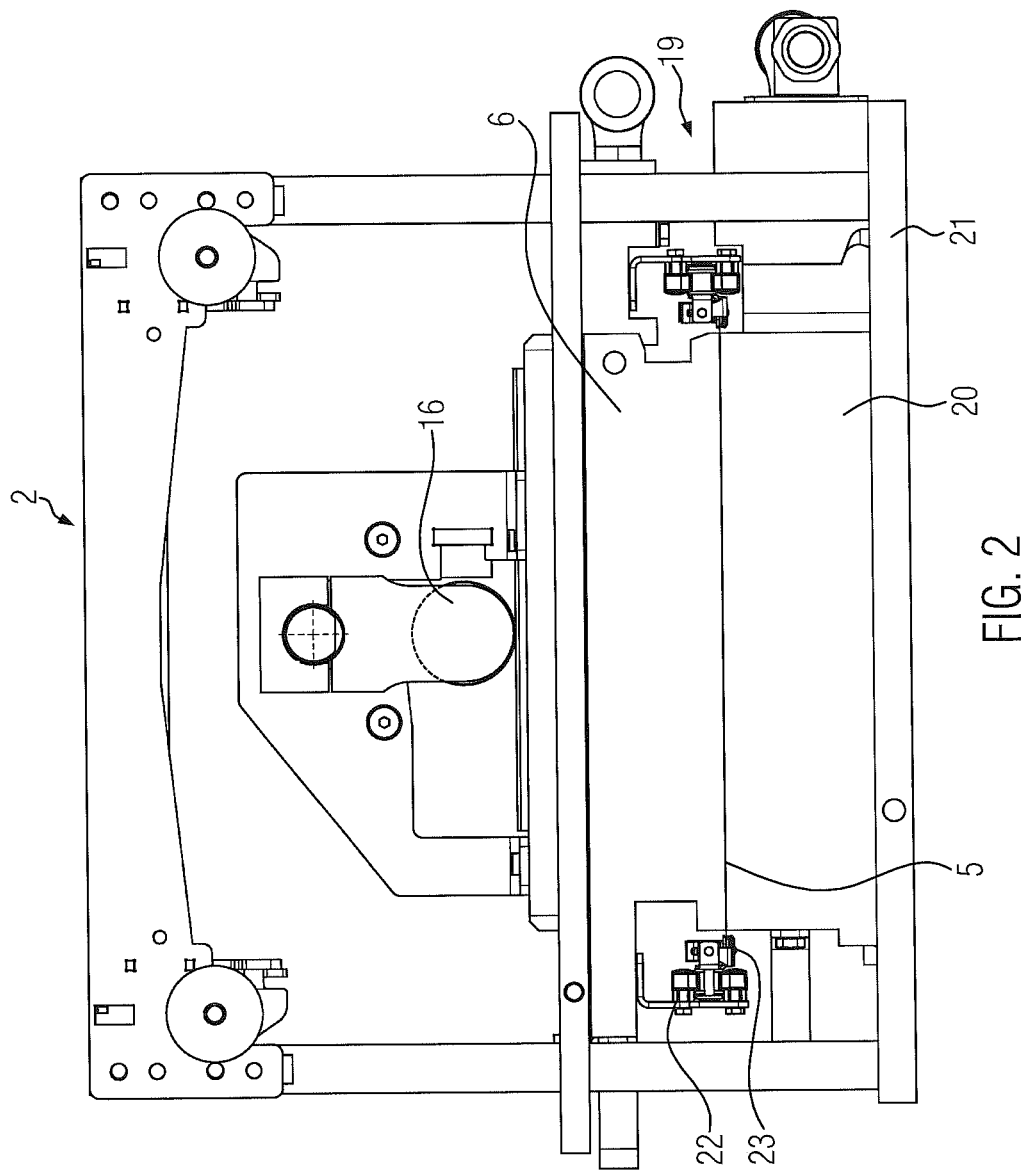

FIG. 2 shows the forming station 2 in the production direction R with a tool changing device 19 according to the present invention, comprising the forming tool 6 and a tool insert 20, which is arranged below the web-shaped material 5 and which is guided and held on the tool carrier 21. A chain guide 22 guides a respective clamp and transport chain 23 on either side, said transport chains 23 conveying the web-shaped material along the production direction R through the work stations. The forming station is shown in a closed position in said FIG. 2, the shaft 16 being located at a lower position.

Figure 3:
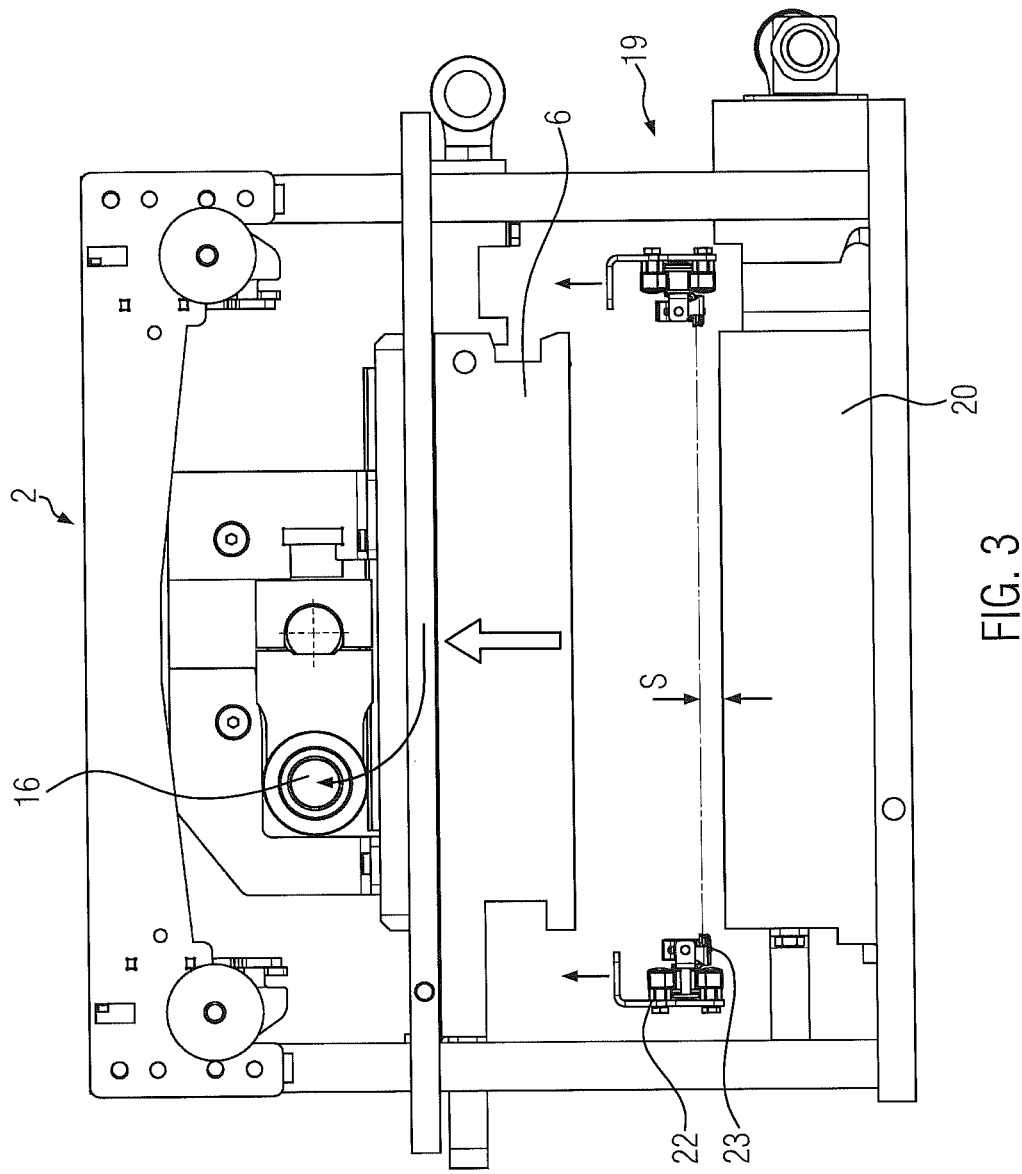

FIG. 3 shows the forming station 2 in an open position in which the forming tool 6 has been raised through the rotation of the shaft 16. The chain guide 22 with the transport chain 23 and the held web-shaped material 5 has been raised by a distance S. This movement can be carried out by a mechanism, which is not shown, in connection with the forming tool 6 or it may be realized by a separate drive, e.g. a pneumatic cylinder or a servo motor. The distance S corresponds to the length which is necessary for positioning the chain guide side 22 facing the tool insert 20 such that it is located above the upper area of the tool insert 20.

Figure 4:
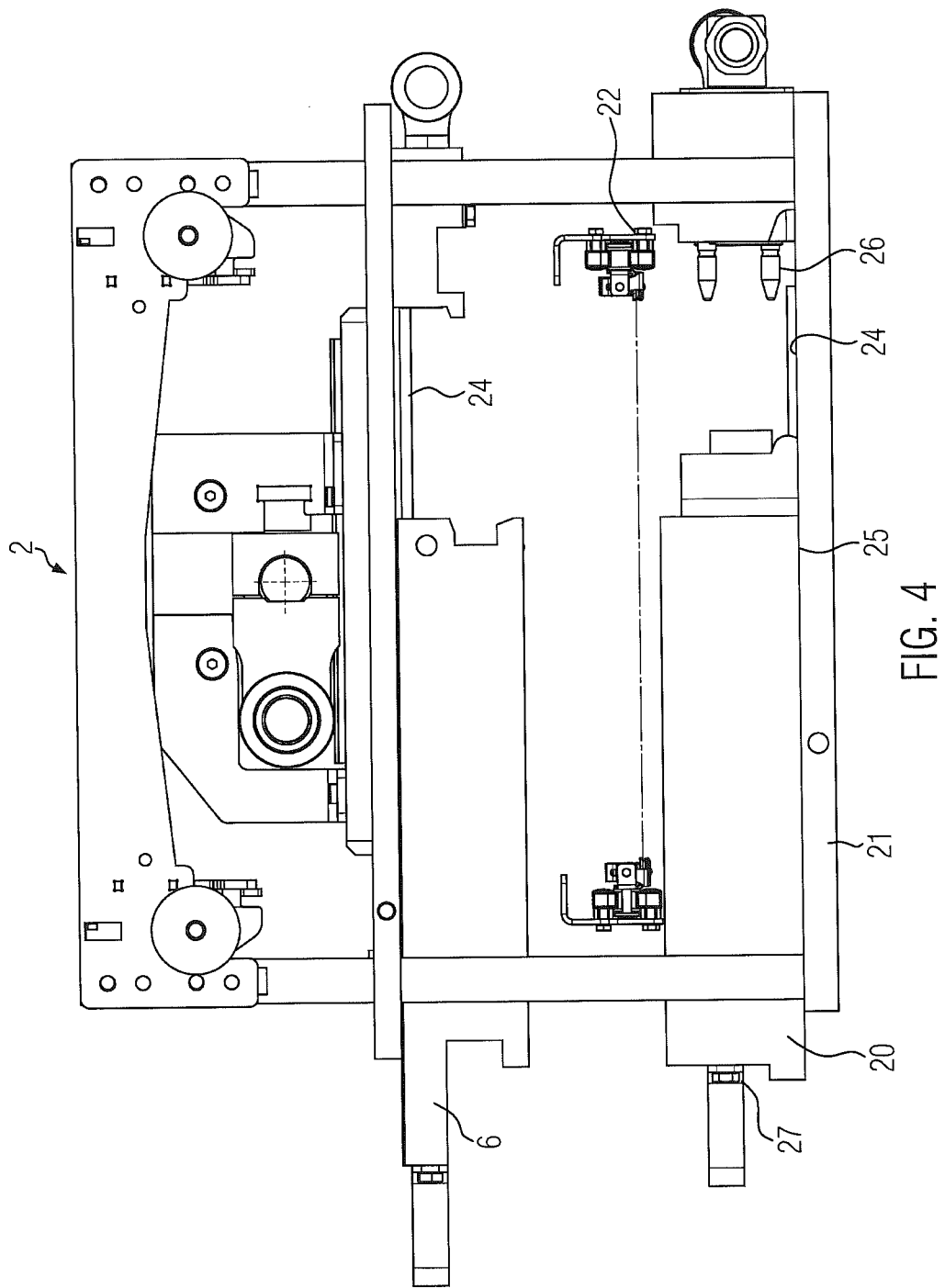

FIG. 4 shows, like FIG. 3, the forming station 2 in an open position. The tool insert 20 and the forming tool 6 are laterally partially drawn out of the forming station 2 and the thermoform packaging machine 1 to the left. Guide units 24 guide the tool insert 20 and the forming tool 6 during the lateral movement and as long as part of the tools 20, 6 are still positioned in the forming station 2 and in the guide units 24, respectively. The tool insert 20 moves laterally outwards below the left chain guide 22 at a small distance from the latter. The work carrier 21 is implemented as a cooling plate comprising a water circuit, which is not shown, and is positioned on the plane 25 in large-area contact with the tool insert 20. Fixing elements 26 are provided on the stop side on the right-hand side on and above the tool carrier for the purpose of fixing and for connecting thereto electrical systems, e.g. for controlling heating rods in a heating plate 20 for heating the web-shaped material 5, and sensor systems, e.g. for evaluating temperature sensors in a heating plate 20. Via a clamping device 27 the tool insert 20 is secured in position on the tool carrier 21 at a working position.

Even if a chain guide 22 is provided on either side of the web-shaped material 5, it will suffice when, for the purpose of tool changing, only one of the two chain guides 22 is adapted to be vertically raised in the way described, this one chain guide being preferably the chain guide on the side towards which the tool insert 20 is to be removed. In particular for reducing tensions in the packaging film, it would alternatively be possible to configure the chain guides 22 on either side of the packaging film such that they are vertically movable. These movements can, in turn, take place such that they are coupled to one another or such that they are separate from one another.

The invention claimed is:

1. A tool changing device for a work station of a thermoform packaging machine, said tool changing device comprising a tool insert and a chain guide for conveying a web-shaped material through the work station, characterized in that the chain guide is vertically movable relative to the tool insert so that the tool insert can be displaced laterally relative to the production direction.

2. A tool changing device according to claim 1, characterized in that the chain guide is movable relative to the tool insert to a changing position and to a working position.

3. A tool changing device according to claim 2, characterized in that the movement of the chain guide is relative to a tool upper part or a tool lower part.

4. A tool changing device according to claim 2, characterized in that the chain guide is movable by means of at least one actuator.

5. A tool changing device according to claim 4, characterized in that the least one actuator is a pneumatic cylinder or a servo motor.

6. A tool changing device according to claim 1, characterized in that the tool insert is a heating plate or a sealing plate.

7. A tool changing device according to claim 1, characterized in that the tool insert is in contact with a cooling plate of a forming station, when said forming station is in operation.

8. A tool changing device according to claim 1, the tool changing device being implemented with a thermoform packaging machine.

9. A method of operating a tool changing device of a work station in a thermoform packaging machine, wherein a chain guide is provided for conveying a web-shaped material through the work station, and the chain guide is, at least in the area of the work station, moved vertically relative to a tool insert to a changing position so as to laterally displace the tool insert relative to the production direction for the purpose of changing.

10. A method according to claim 9, characterized in that the movement of the chain guide to the changing position takes place simultaneously with or after opening of the work station, wherein, during opening of the work station, a tool which is positioned on the side of the web-shaped material facing away from a product is moved relative to and away from the tool insert, which is positioned on the side of the web-shaped material facing the product.

11. A method according to claim 9, characterized in that the movement of the chain guide to a working position takes place before or simultaneously with the closing of the work station, wherein, during closing of the work station, a tool which is positioned on the side of the web-shaped material facing away from a product is moved relative to and towards the tool insert, which is positioned on the side of the web-shaped material facing the product.

12. A method according to claim 9, characterized in that the chain guide is moved by a tool upper part or a tool lower part of the respective work station.

13. A method according to claim 9, characterized in that the movement of the chain guide is executed by means of an actuator.

14. A method according to claim 13, characterized in that the actuator is a pneumatic cylinder or a servo motor.

15. A method according to claim 9, characterized in that the movement of the chain guide takes place while the web-shaped material is standing still.

16. A method according claim 9, characterized in that the tool insert is cooled indirectly by means of a cooling plate of a forming station.

17. A method according to claim 9, characterized in that power lines between the tool insert and a tool carrier are, by means of plug connections, automatically disconnected when the tool insert is being pulled out, and automatically connected when the tool insert is being pushed in.

18. A method according to claim 9, characterized in that the tool insert is automatically unlocked for removal from the work station and/or automatically locked after insertion in the work station.

* * * * *